United States Patent
Van Den Oetelaar et al.

(10) Patent No.: US 7,360,228 B2
(45) Date of Patent: Apr. 15, 2008

(54) MULTI-STACK OPTICAL DATA STORAGE MEDIUM AND USE OF SUCH MEDIUM

(75) Inventors: Ronald Joseph Antonius Van Den Oetelaar, Eindhoven (NL); Hubert Cecile Francois Martens, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 376 days.

(21) Appl. No.: 10/525,578

(22) PCT Filed: Aug. 14, 2003

(86) PCT No.: PCT/IB03/03760

§ 371 (c)(1),
(2), (4) Date: Feb. 23, 2005

(87) PCT Pub. No.: WO2004/021336

PCT Pub. Date: Mar. 11, 2004

(65) Prior Publication Data

US 2005/0223402 A1 Oct. 6, 2005

(30) Foreign Application Priority Data

Aug. 29, 2002 (EP) ................................. 02078573

(51) Int. Cl.
*G11B 7/24* (2006.01)
*G11B 7/242* (2006.01)

(52) U.S. Cl. ................. 720/718; 369/275.1; 369/275.4; 428/64.4; 428/64.9

(58) Field of Classification Search ........................ 430/270.11–270.21; 720/718; 369/275.1, 275.2, 369/275.3, 275.4; 428/64.4, 64.9
See application file for complete search history.

(56) References Cited

U.S. PATENT DOCUMENTS

| | | | |
|---|---|---|---|
| 5,745,475 A * | 4/1998 | Ohno et al. | 369/257.4 |
| 5,764,619 A * | 6/1998 | Nishiuchi et al. | 369/275.1 |
| 6,667,947 B2 * | 12/2003 | Maeda et al. | 369/275.1 |
| 6,709,801 B2 * | 3/2004 | Miyamoto et al. | 430/270.13 |
| 6,728,198 B2 * | 4/2004 | Fujii et al. | 369/275.4 |
| 2003/0185143 A1 * | 10/2003 | Lin et al. | 369/275.4 |

FOREIGN PATENT DOCUMENTS

| | | | |
|---|---|---|---|
| EP | 1067535 A2 | | 1/2001 |
| EP | 10675335 A9 | | 1/2001 |
| EP | 1067535 A3 | | 1/2002 |
| JP | 2002279707 A | * | 9/2002 |
| WO | WO9631875 A2 | | 10/1996 |
| WO | WO9631875 A3 | | 10/1996 |
| WO | WO 2004107329 A1 | * | 12/2004 |

* cited by examiner

Primary Examiner—William J. Klimowicz

(57) ABSTRACT

A multi-stack optical data storage medium, for recording using a focused radiation beam having a wavelength λ and entering through an entrance face of the medium, has a first substrate having a first guide groove formed therein, and a first recording stack including a recordable type recording layer having a thickness $d_{L0G}$ in the groove and a thickness $d_{L0L}$ adjacent the groove. A second substrate has a second guide groove formed therein, and a second recording stack including a recordable type recording layer having a thickness $d_{L1G}$ in the groove and a thickness $d_{L1L}$ adjacent the groove. The second recording stack is at a position closer to the entrance face than the first recording stack. The depth of the first guide groove is smaller than 0.15λ and $d_{L0L}$ is substantially equal to or larger than $d_{L1G}$.

8 Claims, 4 Drawing Sheets

MULTI-STACK OPTICAL DATA STORAGE MEDIUM AND USE OF SUCH MEDIUM

BACKGROUND OF THE INVENTION

1. Field of the Invention

The invention relates to a multi-stack optical data storage medium for recording using a focused radiation beam having a wavelength λ and entering through an entrance face of the medium during recording, comprising:

a first substrate having, on a side thereof:
a first $L_0$ guide groove formed therein, and
a first recording stack $L_0$ comprising a recordable type $L_0$ recording layer, the $L_0$ recording layer having a thickness $d_{L0G}$ in the groove and a thickness $d_{L0L}$ adjacent the groove, and a first reflective layer present between the $L_0$ recording layer and the first substrate;

a second substrate having, on a side thereof:
a second $L_1$ guide groove formed therein, and
a second recording stack $L_1$ comprising a recordable type $L_1$ recording layer, the $L_1$ recording layer having a thickness $d_{L1G}$ in the groove and a thickness $d_{L1L}$ adjacent the groove, said second recording stack being present at a position closer to the entrance face than the $L_0$ recording stack; and a transparent spacer layer sandwiched between the recording stacks, said transparent spacer layer having a thickness substantially larger than the depth of focus of the focused radiation beam.

The invention also relates to the use of such a medium.

2. Description of the Related Art

An embodiment of an optical recording medium as described in the opening paragraph is known from European Patent Application EP1067535A2, corresponding to U.S. Patent Application Publication No. 2005/0063295. The most common embodiment of the medium is a circular disk.

Regarding the market for optical recording, it is clear that the most important and successful format so far is a write-once format, Compact Disk Recordable (CD-R). Although the take-over in importance by Compact Disk ReWritable (CD-RW) has been predicted since a long time, the actual market size of CD-R media is still at least an order of magnitude larger than for CD-RW. Furthermore, the most important parameter for drives is the maximum write speed for R-media, not for RW. Of course, a possible shift of the market to CD-RW is still possible, e.g., because of Mount Rainier standardization for CD-RW. However, the R-format has been proven very attractive due to its 100% compatibility with read-only compact disk (CD).

Recently, the Digital Versatile Disk (DVD) has gained marketshare as a medium with a much higher data storage capacity than the CD. Presently, this format is available in a read only (ROM) and a rewritable (RW) version. Next to the DVD ReWritable (DVD+RW) standard, a new recordable (R), i.e., write once, DVD+R standard was developed. The new DVD+R standard gets increasing attention as an important support for DVD+RW. A possible scenario is that the end customers have become so familiar with an optical write-once format that they might accept it more easily than a re-writable format.

An issue for both the R and RW formats is the limited capacity, and therefore recording time, because only single-stacked media are present. Note that for DVD-Video, which is a ROM disk, dual-layer media already have a considerable market share. A dual-layer, i.e., dual-stack, DVD+RW disk is probably feasible. However, it has become clear that a fully compatible disk, i.e., within the reflection and modulation specification of the dual-layer DVD-ROM, is very difficult to achieve and requires at least a major breakthrough for the properties of the amorphous/crystalline phase-change materials, which are used as recording layers in, e.g., DVD+RW media. Without a full compatibility, the success of a dual-layer DVD+RW in the market is questionable.

In order to obtain a dual-layer DVD+R medium which is compatible with the dual-layer DVD-ROM standard, the effective reflectivity of both the upper $L_1$ layer and the lower $L_0$ layer should be at least 18%. The term "effective" means that the reflection is measured as the portion of effective light coming back from the medium when both stacks $L_0$ and $L_1$ are present and focusing on $L_0$ and $L_1$, respectively. This implies that the $L_0$ stack as such requires a far higher reflection level of, e.g., more than 50%, preferably more than 60%, because the $L_1$ stack absorbs a substantial portion of the incoming and outgoing light. It should be noted that in this document, the normally used convention of notation of $L_0$ and $L_1$, in which notation $L_0$ is the "closest" stack, i.e., closest to the radiation beam entrance face, has been changed: $L_0$ now is the deepest stack and $L_1 \ldots L_n$ are stacks closer to the radiation beam entrance face. In EP1067535A2, the following definitions are used: dG1 (corresponding to $d_{L1G}$ in this document) is the thickness of the dye layer in a groove of the first or top information recording/reproduction unit which corresponds to $L_1$, dG2 (corresponding to $d_{L0G}$ in this document) is the thickness of the dye layer in a groove of the second information recording/reproduction unit which corresponds to $L_0$. dL1 (corresponding to $d_{L1L}$ in this document) is the thickness of the dye layer on a land corresponding to $L_1$, dL2 (corresponding to $d_{L0L}$ in this document) is the thickness of the dye layer on a land corresponding to $L_0$. The depth of the grooves corresponding to $L_1$ is d1 but the depth of the grooves d2 corresponding to $L_0$ is defined differently. d2 is the height difference of lands and grooves measured on the dye surface after a dye layer has been coated. dG2, d2 and dL2 are set to approximately 174, 140 and 120 nm. A calculation shows that this corresponds to a groove depth g in the substrate corresponding to $L_0$ of about 194 nm. Measurements by applicants have shown that the inverted $L_0$ stack of the known medium with grooves with a depth of 194 nm has a reflectivity of only 15%-50% of the reflectivity of blank areas (i.e., without grooves). This means that it is impossible to reach the desired 60% reflection level because in order to obtain a dual-layer DVD+R medium which is compatible with the dual-layer DVD-ROM standard, the reflectivity of a light beam focused onto the data track of the lower $L_0$ layer should be sufficiently high (typically >60%, depending on the transmission of the upper $L_1$ layer). From a dual-stack DVD+R production point of view, an inverted $L_0$ layer structure is preferred which means that the recording layer of the $L_0$ stack is present at a side of the reflective layer other than the side of the substrate with groove structure. In EP1067535A2, it is proposed to that dG1 is substantially equal to dG2 and that dL1 is substantially equal to dL2. Furthermore dG1 should be larger than dL1, whereas dG2 should be larger than dL2.

SUMMARY OF THE INVENTION

It is an object of the invention to provide an optical data storage medium of the type mentioned in the opening paragraph which has a reflection level of the $L_0$ stack and a modulation level of recorded marks in the recording layer of the $L_0$ recording stack which is compatible with the dual-layer DVD-ROM specification.

This object is achieved in accordance with the invention by an optical storage medium, characterized in that the depth of the first $L_0$ guide groove is smaller than 0.15λ and that $d_{L0L}$ is substantially equal to or larger than $d_{L1G}$. Shallow grooves are proposed in order to achieve a high reflection value of the $L_0$ stack. According to calculations, grooves deeper than 0.3λ may also achieve a high reflection but are more difficult to manufacture from the point of view of mastering and injection molding. The explanation for the reduced reflection above 0.15λ may be that grooves covered with metal act as a waveguide for the radiation beam, thereby lowering the effective reflectivity due to optical effects. At depths >0.3λ, these effects may again lead to an increase of the reflection. Since the $L_0$ stack is recorded on land, i.e., in between the $L_0$ guide groove generally formed as a spiral, it is required that the thickness $d_{L0L}$ is at least substantially equal to the thickness $d_{L1G}$. This is because applicants have had the insight that a minimum amount of dye thickness is required in order to have marks recorded which have sufficient modulation. Modulation is defined as the difference of the values of reflection of unrecorded and recorded marks divided by the value of maximum reflection. During recording, the optical properties of the recording layer, e.g., a dye material, are changed due to an increase in temperature. Sufficient modulation can only be obtained if the change in refractive index of the dye ($\Delta n_{dye}$) times the thickness of the dye, i.e., $\Delta n_{dye} \times d_{L0L}$, is sufficiently large. If $d_{L1G}$ is chosen such that a modulation of at least 60%, as required by the DVD-ROM specification, is obtained in recording layer $L_1$, experiments have indicated that a modulation of at least 60% in recording layer $L_0$ can only be reached if $d_{L0L}$ is at least equal to or larger than $d_{L1G}$. Usually the recording layer, e.g., a dye, is deposited using spin coating technique, and therefore, when $d_{L0G}$ is made substantially equal to $d_{L1G}$, $d_{L0L}$ will be smaller than $d_{L1G}$ because the lands of $L_0$ will have a shallower recording layer than the adjacent grooves of $L_0$. When $d_{L0L}$ is substantially equal to or larger than $d_{L1G}$, this effect is compensated for and a sufficient modulation level of the marks in the $L_0$ recording layer is achieved combined with a high maximum reflection level. The wavelength λ of the radiation beam is substantially 655 nm (DVD) or smaller for future formats.

In an embodiment, $d_{L0G}$ is substantially equal to or larger than $2d_{L1L}$. When using an $L_0$ guide groove depth of about ⅓ of the $L_1$ guide groove depth, a relatively high reflection value of the $L_0$ stack is achieved. The $L_0$ stack is recorded on-land (as opposed to in-groove) in order to obtain the proper sign of the modulation (high-to-low recording). This has an additional advantage that the push-pull guide groove tracking signal has the proper sign ("on-land"). The parameter L is defined as:

$$L = (d_G - d_L)/G$$

in which $d_G$ is the recording layer thickness in the groove, $d_L$ is the recording layer thickness on land and G is the groove depth. This parameter is a measure for the leveling out of the recording layer after depositing on the groove structure. Normally, when having relatively deep guide grooves of 100 nm or more and the recording layer is deposited by spin coating, typically the leveling is between about 0.2 and 0.5. L=0 means that $d_G = d_L$ and L=1 means that the top surface of the dye is completely flat after depositing on the guide groove structure. But when using a relatively shallow $L_0$ guide groove, a leveling factor of L=1 or close hereto may be assumed. In this case, when $d_{L0G}$ is substantially equal to or larger than $2d_{L1L}$, relatively good recording results are achieved.

In another embodiment, the recordable type $L_0$ and $L_1$ recording layers comprise an organic dye. In a preferred embodiment, $d_{L1G}$ is larger than $d_{L1L}$. When using spin coating for depositing the dye of the $L_1$ recording layer, the grooves will have a thicker recording layer than the adjacent lands. This is advantageous for the recording behavior of the $L_1$ recording layer because in organic dye based recording, the recording process is optimal when the dye volume, in which the data, i.e., marks, are recorded, is confined within the guide grooves present on the surface of the substrate.

In an embodiment, a dielectric layer may be present at a side of the $L_0$ recording layer opposite from the side where the first reflective layer is present. This has the advantage of even a better modulation. The dielectric layer preferably has a thickness in the range of 5 nm-120 nm.

In yet another embodiment, a second reflective layer comprising a metal is present at a side of the $L_0$ recording layer opposite from the side where the first reflective layer is present. Preferably, the second reflective layer has a thickness in the range of 5 nm-15 nm. The second reflective layer preferably mainly comprises a metal selected from the group of Ag, Au and Cu. The second reflective layer has the advantage of an even higher reflection of the $L_0$ stack. Small variations in stack design may be required to reach a good recording performance.

An additional advantage of the use of shallow grooves in an inverted $L_0$ stack is that a wobble of the guide groove is less visible in the reflection of the radiation beam. A wobble is used to modulate additional information in the guide groove, e.g., an address or time signal. When, e.g., using a guide groove with a depth $G_{L0}$ of 160 nm, a variation of 15% is visible in the signal with the same periodicity as the wobble. At a groove depth $G_{L0}$ of 35 nm this variation is substantially absent.

BRIEF DESCRIPTION OF THE DRAWINGS

The invention will be elucidated in greater detail with reference to the accompanying drawings, in which.

DESCRIPTION OF THE PREFERRED EMBODIMENTS

Figure 1:
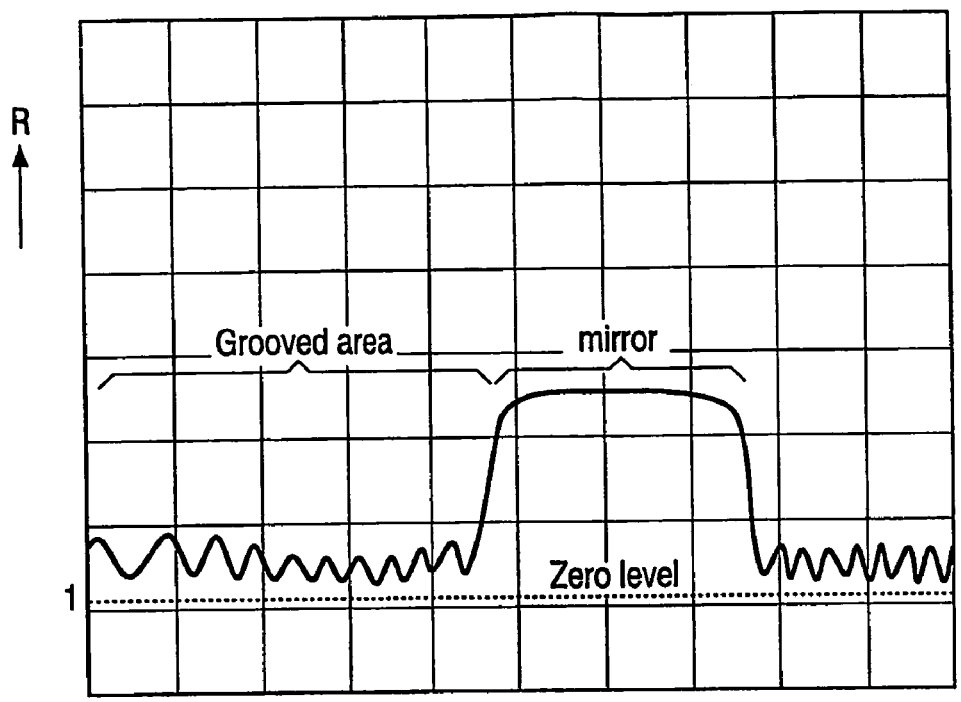
FIG. 1 shows the reflectivity on a blank area (mirror) and grooved area for an inverted $L_0$ DVD+R stack, in which the groove depth is 126 nm, and the reflectivity on the grooved area is only about 15% of the reflectivity on the blank area.

In FIG. 1, the results of experiments on inverted LDVD+R stacks are presented when a substrate with a groove depth GL0 of 126 nm, not according to the invention, was used. The reflectivity on the grooved area is approximately 15% of the reflectivity on the blank area (mirror). This value is not acceptable.

Figure 2:
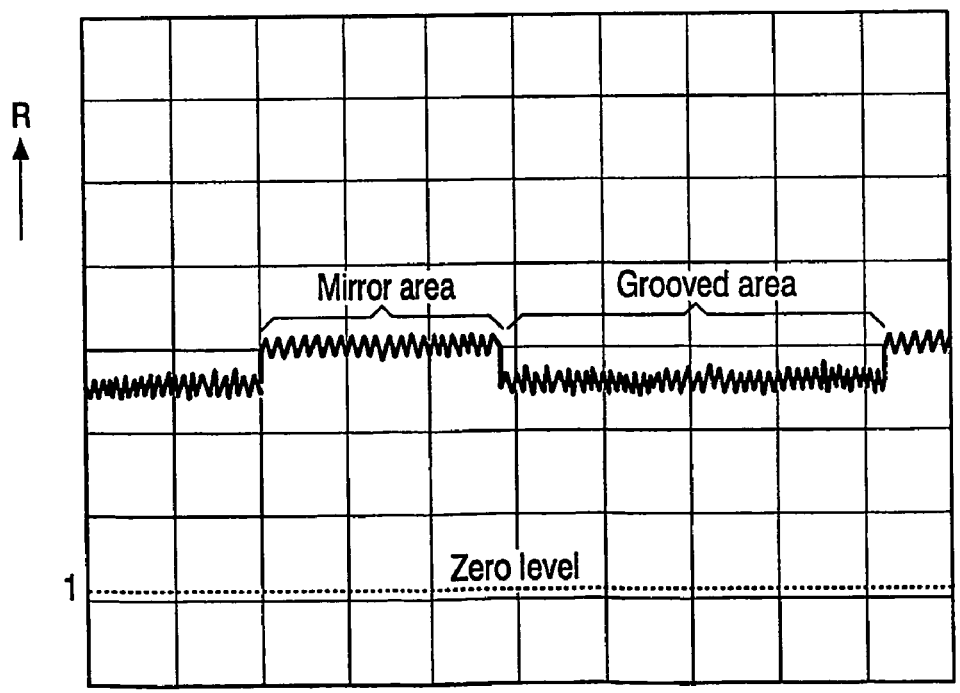
FIG. 2 shows the reflectivity on a blank area (mirror) and grooved area for an inverted $L_0$ DVD+R stack, in which groove depth is 35 nm, and the reflectivity on the grooved area is approximately 85% of the reflectivity on the blank area.

In FIG. 2, the results of experiments on inverted $L_0$ DVD+R stacks are shown. A DVD+RW substrates with a groove depth of about 35 nm, according to the invention, was used. The reflectivity on the grooved area is approximately 85% of the reflectivity on the blank area, which is significantly higher than for deeper grooves. The disks still shows sufficient push-pull signal, so tracking is possible. Also the experiments show that it is possible to write data, although the modulation appears to be relatively low (10%, 11T carrier to noise ratio CNR~30 dB) but with the stack design of FIGS. 5a and 5b, and FIG. 6, a high modulation is possible. The $L_0$ substrate 31a had 35 nm deep grooves with a FWHM width WL0 of 300 nm, a reflective layer 39 of 100 nm Ag, and 80 nm azo dye recording layer 35, and a protective layer. Typical dyes that can be used are (phthalo) cyanine-type, azo-type, squarylium-type, pyrromethene-type or other organic dye material having the desired properties.

Figure 3:
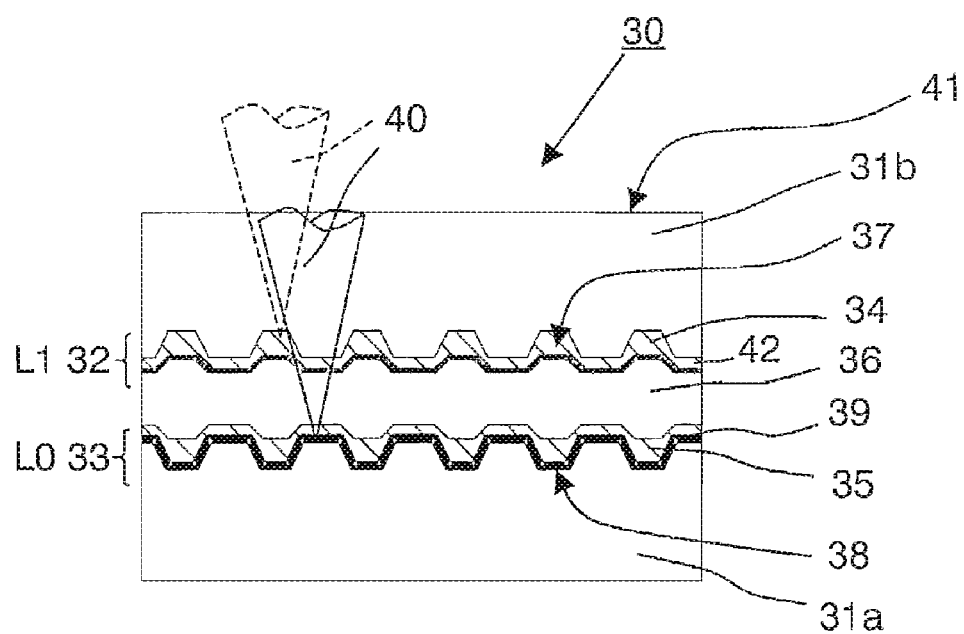
FIG. 3 schematically shows a cross-section of an embodiment according to the invention with an inverted $L_0$ stack.

In FIG. 3, a multi-stack optical data storage medium 30 for recording is shown. A focused radiation beam, i.e., a 655 nm laser-light beam 40, enters through an entrance face 41 of the medium 30 during recording. The medium comprises a first substrate 31a having, on a side thereof, a first recording stack 33, $L_0$, comprising a recordable type $L_0$ recording layer 35, i.e., an azo dye. The $L_0$ recording layer is formed in a first $L_0$ guide groove 38 present in the first substrate 31a, and a first reflective layer 39 is present between the $L_0$ recording layer 35 and the first substrate 31a. A second substrate 31b is present having, on a side thereof, a second recording stack 32, $L_1$, comprising a recordable azo dye type $L_1$ recording layer 34. The second $L_1$ recording stack 32 is present at a position closer to the entrance face than the $L_0$ recording stack 33 and formed in a second $L_1$ guide groove 37. A transparent spacer layer 36 is sandwiched between the recording stacks 32, 33 and has a thickness of approximately 40 μm. The first $L_0$ guide groove 38 has a depth of 35 nm. The first substrate 31a with $L_0$ is attached to the substrate with $L_1$ with the transparent spacer layer 36 in between which may act as bonding layer. A semi-transparent reflective layer 42, comprising, e.g., Cu or Ag, is present adjacent the $L_1$ recording layer 34. Specific suitable $L_0$ stack designs named stack 1 and stack 2 are discussed elsewhere in this document with the description of FIGS. 5a and 5b, and FIG. 6. The preferred spacer-layer thickness for both disk types is 40 μm to 70 μm. One specific embodiment would be:

$L_1$:$d_{L1G}$=80 nm, $d_{L1L}$=30 nm dye/12 nm Ag/UV curable resin(protective layer)

$L_1$ guide groove depth 160 nm;

$L_0$100 nm $(ZnS)_{80}(SiO2)_{20}$/$d_{L0L}$=120 nm, $d_{L0G}$=150 nm dye/100 nm AG, $L_0$ guide groove depth 30 nm; and a spacer thickness of 50 μm. The effective reflection from $L_1$ is about 19%, effective reflection (measured through $L_1$) from $L_0$ is about 19%.

The upper $L_1$ stack of a recordable dual-stack DVD disk should have high transparency in order to be able to address the lower lying $L_0$ stack. At the same time, $L_1$ preferably should have a reflectivity of at least 18% in order to meet the dual layer DVD-ROM specification. The stacks proposed here are not restricted to use in DVD+R-Dl and can be applied in any (multi-stack) organic-dye based optical recording medium.

Figure 4A:
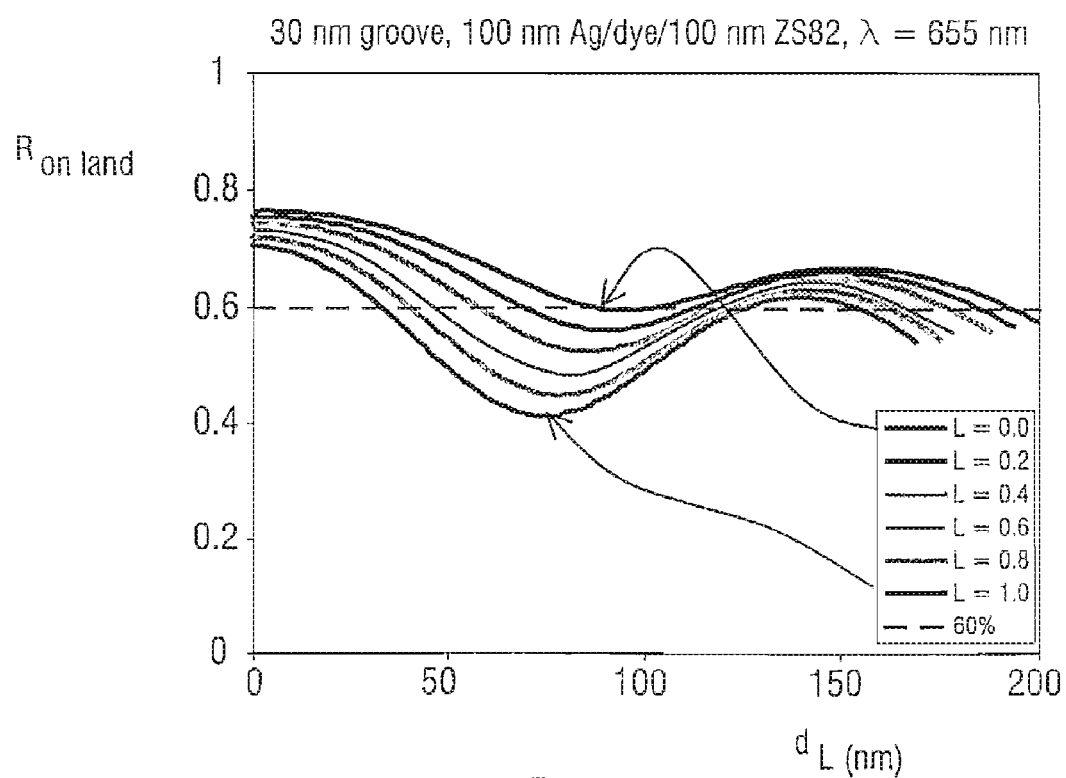
FIGS. 4a and 4b show the calculated result of a modeling study of a stack design according to the invention.
Figure 4B:
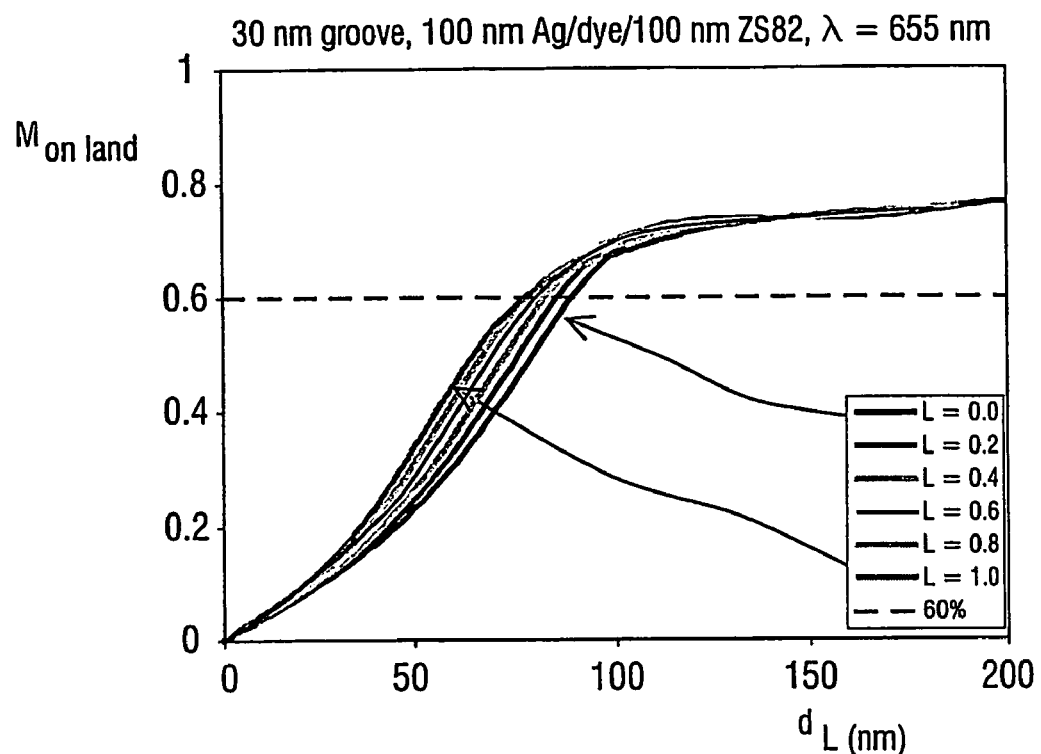

In FIGS. 4a and 4b, modeling results are presented of a stack with the following design:

Stack 1

30 to 40 nm deep guide grooves in substrate 31a, an optically closed Ag first reflective layer 39 of 100 nm. Other metals, e.g., Au, Cu or Al, may be used as well, an azo dye layer, with thickness of 130 nm on land, the refractive index of the dye at a radiation beam wavelength of 655 nm is 2.24-0.02 i which corresponds to a typical DVD-R dye, 80 to 120 nm $(ZnS)_{80}(SiO2)_{20}$, other dielectrics with n~2.1 give identical results.

This design combines a high reflectivity and a high modulation of the inverted $L_0$ recording stack for the case of shallow grooves. The stacks should be recorded on-land (as opposed to in-groove) in order to obtain the proper sign of the modulation (high-to-low recording). This has an additional advantage that the push-pull signal has the proper sign ("on-land"). The definition of parameter L is described earlier.

In FIG. 4a, the calculated results of the on-land reflection as a function of the on-land dye thickness $d_L$ are shown.

In FIG. 4b, the calculated results of on-land modulation as a function of the on-land dye thickness $d_l$ are shown. The horizontal dotted line indicates a minimum desired level. It can be noted that the desired level is reached at a dye thickness range of about 100-130 nm.

Experimental results obtained with this stack 1 are: A high modulation of 75% and a higher reflection level of 61%. Modulation is generally defined as $(R_{mark}-R_{no-mark})/R_{max}$ in which formulate $R_{mark}$ and $R_{no-mark}$ are the reflection levels from the read out laser beam when, respectively, a written mark and no mark is present and $R_{max}$ is the maximum reflection. The laser beam power required to write in the $L_0$ layer is only 7 mW, which is favorable in view of the presence of the $L_1$ stack because a relatively large portion of the power will be absorbed in the $L_1$ stack.

Figure 5A:
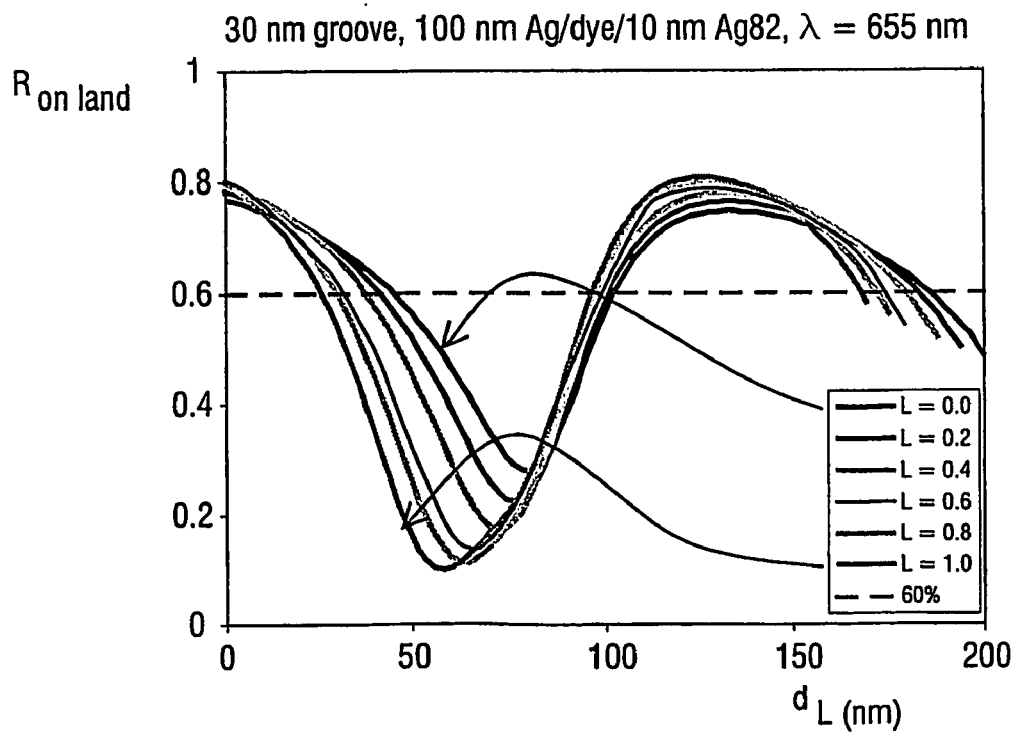
FIGS. 5a and 5b show the calculated result of a modeling study of another stack design according to the invention.
Figure 5B:
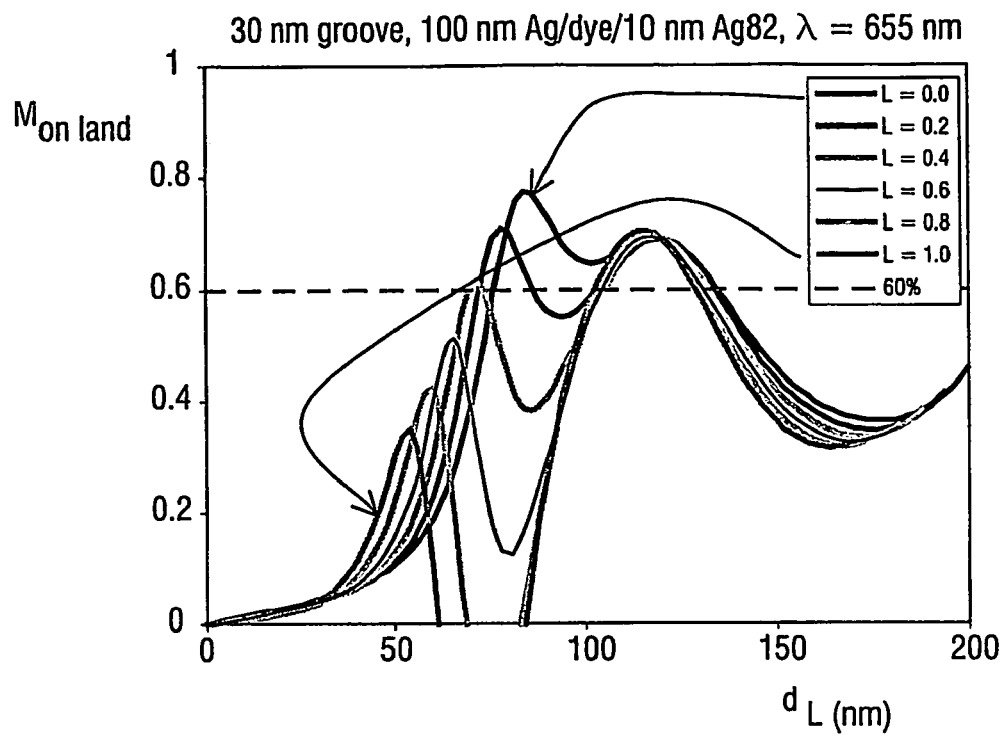

In FIGS. 5a and 5b, modeling results are presented of a stack with the following design:

Stack 2

30 to 40 nm deep guide grooves in substrate 31a, an optically closed Ag reflective layer 39 of 100 nm, other metals, e.g., Au, Cu or Al, may be used as well, an azo dye layer, thickness 100 to 130 nm on land, the refractive index of the dye at a radiation beam wavelength of 655 nm is 2.24-0.02 i which corresponds to a typical DVD-R dye, a 5 to 15 nm second reflective layer of Ag, other metals, e.g., Au or Cu, may be used as well.

Experimental results obtained with this stack 2 are: A high modulation of 75% and a high reflection level of 64%. The laser beam power required to write in the $L_0$ layer is only 7 mW, which is favorable in view of the presence of the $L_1$ stack because a relatively large portion of the power will be absorbed in the $L_1$ stack.

A third stack design is possible which is not shown in a drawings but is described here:

Stack 3

30 to 40 nm deep guide grooves in substrate 1a, an optically closed Ag reflective layer 39 of 100 nm, other metals, e.g., Au, Cu or Al, may be used as well, an azo dye layer 35, thickness 90 nm to 160 nm on land, the refractive index of the dye at a radiation beam wavelength of 655 nm is 2.24-0.02 i which corresponds to a typical DVD-R dye, a 5 to 50 nm layer of SiO2, other dielectrics may be used as well.

The advantage of this third stack design is that it is more easy to manufacture compared to the second stack design.

Figure 6:
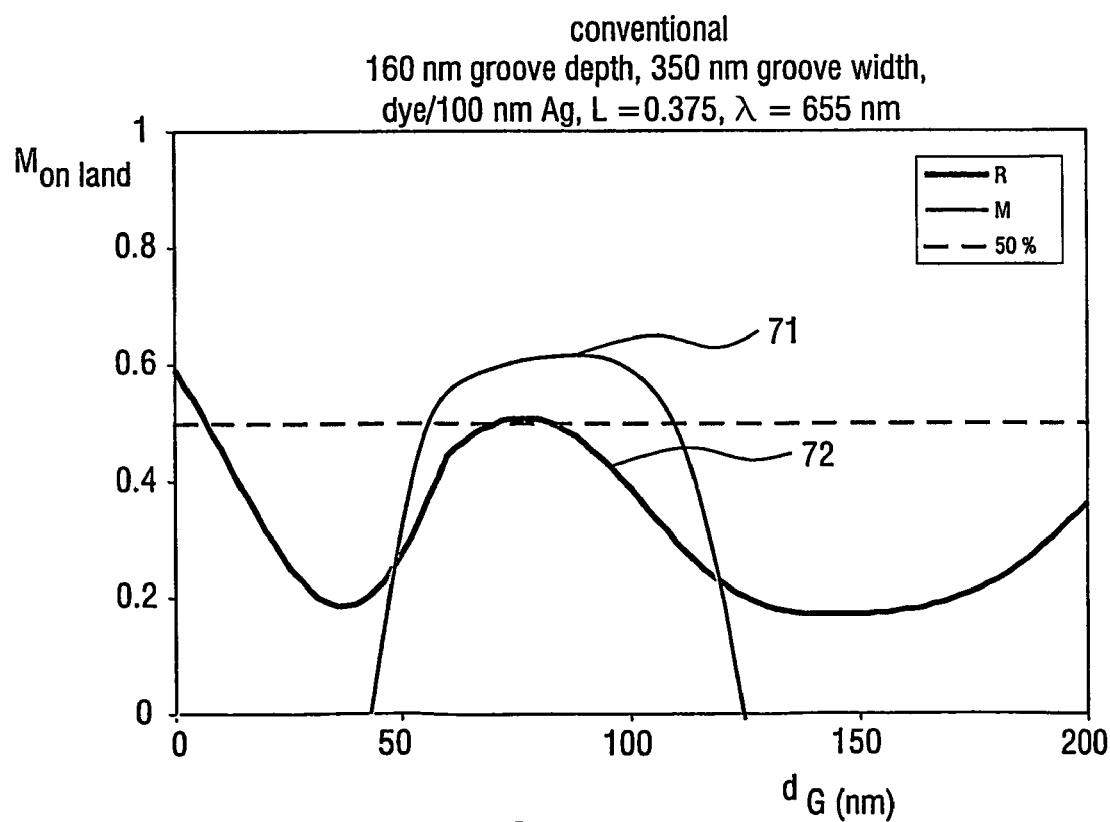
FIG. 6 show the reflection and modulation calculated for a reference disk, i.e., single-layer DVD+R.

In FIG. 6, as an example, the results for a conventional single stack DVD+R disk is shown. The refractive index of the dye is taken as 2.24-0.02 i (this corresponds to a typical dye). According to the calculations, around a thickness of 80 to 90 nm of dye, both the on-groove reflection curve 72 and the on-groove modulation curve 71 are at optimum values. The calculated reflectivity and modulation agree well with experimentally obtained values. To achieve good signal quality from the $L_0$ layer, it was attempted to obtain stack designs that combine high reflectivity with a high modulation (both >60%). It turns out that for a straightforward three-layer stack-design, in-groove recorded signals have the wrong polarity (low-to-high recording, not shown) in most cases. Thus for the case of shallow grooves, on-land recording may be considered, or more complicated stack designs.

Both stack designs of FIGS. 4a/4b and FIGS. 5a/5b according to the invention have a recorded mark modulation value and an effective $L_0$ stack reflection value that is relatively high, i.e., meeting the dual-layer DVD specification. Note that the stacks proposed here are optimized for relatively shallow grooves, i.e. approximately 35 nm but that other groove depths are possible, e.g., <80 nm. The optimal groove depth scales with the radiation beam wavelength $\lambda$.

It should be noted that the above-mentioned embodiment illustrates rather than limits the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention a multi-stack optical data storage medium for recording using a focused radiation beam having a wavelength $\lambda$ and entering through an entrance face of the medium is described. It has a first substrate having, on a side thereof, a first $L_0$ guide groove formed therein, and a first recording stack $L_0$, comprising a recordable type $L_0$ recording layer. The $L_0$ recording layer has a thickness $d_{L0G}$ in the groove and a thickness $d_{L0L}$ adjacent the groove, and a first reflective layer present between the $L_0$ recording layer and the first substrate. A second substrate has, on a side thereof, a second $L_1$ guide groove formed therein, and a second recording stack $L_1$ comprising a recordable type $L_1$ recording layer. The $L_1$ recording layer has a thickness $d_{L1G}$ in the groove and a thickness $d_{L1L}$ adjacent the groove. The second recording stack is present at a position closer to the entrance face than the $L_0$ recording stack. The depth of the first $L_0$ guide groove is smaller than $0.15\lambda$ and $d_{L0L}$ is substantially equal to or larger than $d_{L1G}$, by which it is achieved that the $L_0$ stack has a reflection level and a modulation level of recorded marks compatible with the dual layer DVD-ROM specification.

The invention claimed is:

1. A multi-stack optical data storage medium for recording using a focused radiation beam having a wavelength $\lambda$ and entering through an entrance face of the medium during recording, the multi-stack optical data storage medium comprising:
   a first substrate having, on a side thereof:
   a first $L_0$ guide groove formed therein, and
   a first recording stack $L_0$ comprising a recordable type $L_0$ recording layer, the $L_0$ recording layer having a thickness $d_{L0G}$ in the groove and a thickness $d_{L0L}$ adjacent the groove, and a first reflective layer present between the $L_0$ recording layer and the first substrate;
   a second substrate having, on a side thereof:
   a second $L_1$ guide groove formed therein, and
   a second recording stack $L_1$ comprising a recordable type $L_1$ recording layer, the $L_1$ recording layer having a thickness $d_{L1G}$ in the groove and a thickness $d_{L1L}$ adjacent the groove, said second recording stack being present at a position closer to the entrance face than the $L_0$ recording stack; and
   a transparent spacer layer sandwiched between the recording stacks, said transparent spacer layer having a thickness substantially larger than the depth of focus of the focused radiation beam,
   wherein the depth of the first $L_0$ guide groove is smaller than $0.15\lambda$, the recordable type $L_0$ and $L_1$ recording layers comprise an organic dye, and the thickness $d_{L0L}$ of the $L_0$ recording layer adjacent the groove is substantially equal to or larger than the thickness $d_{L1G}$ of the $L_1$ recording layer in the groove,
   and wherein a reflectivity level of the first recording stack $L_0$ is more than 50%, and a modulation of recorded marks in the $L_0$ recording layer is more than 60%.

2. The multi-stack optical data storage medium as claimed in claim 1, wherein the thickness $d_{L0G}$ of the $L_0$ recording layer in the groove is substantially equal to or larger than twice the thickness $2d_{L1L}$ of the $L_1$ recording layer adjacent the groove.

3. The multi-stack optical data storage medium according to claim 1, wherein the thickness $d_{L1G}$ of the $L_1$ recording layer in the groove is larger than the thickness $d_{L1L}$ of the $L_1$ recording layer adjacent to the groove.

4. The multi-stack optical data storage medium as claimed in claim 3, wherein a dielectric layer is present at a side of the $L_0$ recording layer opposite from the side where the first reflective layer is present.

5. The multi-stack optical data storage medium as claimed in claim 4, wherein the dielectrical layer has a thickness in the range of 5 nm-120 nm.

6. The multi-stack optical data storage medium as claimed in claim 3, wherein a second reflective layer comprising a metal is present at a side of the $L_0$ recording layer opposite from the side where the first reflective layer is present.

7. The multi-stack optical data storage medium as claimed in claim 6, wherein the second reflective layer has a thickness in the range of 5 nm-15 nm.

8. The multi-stack optical data storage medium as claimed in claim 6, wherein the second reflective layer mainly comprises a metal selected from the group of Ag, Au and Cu.

\* \* \* \* \*